United States Patent Office 3,332,816
Patented July 25, 1967

3,332,816
PRIMER OR ACTIVATOR COMPOSITION
AND METHOD
Lester W. Kalinowski, Park Ridge, Ill., assignor to Broadview Chemical Corporation, Stone Park, Ill., a corporation of Illinois
No Drawing. Filed Aug. 23, 1963, Ser. No. 304,207
14 Claims. (Cl. 156—307)

This invention relates to primer compositions and especially to such compositions useful for coating metal surfaces. More particularly, the invention relates to a primer composition which is useful in improving adherence of sealants to metal surfaces.

Sealant compositions for metal surfaces have been proposed to secure facing metal surfaces against movement with respect to each other. Such sealant compositions are becoming more and more important and are finding wider application in such areas as the joining of nuts and bolts in the absence of lock washers, the joining of gears to shafts for rotation therewith, the joining of winding structures to armatures in electric motors without force spinning, and the like. For example, in copending application Ser. No. 298,428 entitled, "Sealant Composition," and filed on July 30, 1963, now U.S. Patent No. 3,249,656, there is proposed a sealant which includes a normally liquid acrylic ester monomer, a prepolymer of an ester of allylic alcohol and an aromatic polycarboxylic acid and an amide catalyst system, which sealant composition may conveniently be used for such joining of metal surfaces to each other.

Where the metal surfaces to be joined are active, a sealant composition such as that described above may in itself give a strong bond in a short set-up time, important in any assembly operation. However, on such less active surfaces as plastic surfaces, certain zinc and cadmium plated surfaces, anodized aluminum surfaces, lead alloy surfaces, phosphated or Parkerized steel surfaces, and the like, the surface is not sufficiently active to permit setting up or polymerization of the sealant composition within a reasonably short period of time.

The inactivity of such surfaces has been well recognized in the art. It has been proposed to treat such surfaces with soaps of copper, cobalt, manganese, iron and the like, e.g. copper or cobalt naphthenates, as primers to promote faster and better surface bonding. Such treatment with the soap primer provides a moderate improvement in the rate of polymerization of the sealant composition during setup, but polymerization is frequently incomplete and the final bond is often of poor strength. To further improve the bond strength, it has also been proposed to use such metallic soaps in conjunction with an agent for etching the surface to be primed. However, such etching agents are undesirable in many applications because they discolor the surface and often destroy or render ineffective the plating or coating on a surface.

It is a general object of the present invention to provide a new and useful non-staining primer or activator composition.

More particularly, it is an object of this invention to provide such a primer or activator composition which permits or promotes a fast cure with complete polymerization and no loss in bond strength and which at the same time does not discolor or destroy surfaces or surface coatings.

Another object of this invention is to provide such a new and useful primer or activator composition which is useful in rendering inactive surfaces capable of receiving and bonding by a sealant composition.

Other objects will be apparent from the description given hereinbelow.

In accordance with the present invention, there is provided a primer composition which includes as an essential ingredient an organic quaternary ammonium compound capable of improving the set time of a sealant composition when the sealant composition is applied to a surface primed with the quaternary ammonium compound. In an advantageous form, the quaternary ammonium compound is used in combination with a metal soap for improving not only the set time but for providing more complete polymerization of the sealant composition. In the preferred form, the quaternary ammonium compound and metal soap are used in combination in a suitable solvent which has the ability to degrease the surface to be primed, i.e. remove oily or greasy films, coatings or the like from the surface. Such solvents which function as solvents for greases and oils are well-known.

The quaternary ammonium compound is a compound having the formula:

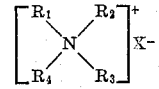

in which $R_1$, $R_2$, $R_3$, and $R_4$ are each $C_1$–$C_{22}$ hydrocarbon groups and X is an inorganic anion, such as, for example, may be selected from the class consisting of halogen, nitrite, nitrate and sulphate ions as the presently most common anions in such quaternary ammonium compounds. The hydrocarbon groups may be aromatic or nonaromatic and include the alkyls, aralkyls and cycloalkyls and the total carbon atoms in $R_1$, $R_2$, $R_3$, and $R_4$ should be sufficient to render the compound soluble in the solvent used, in compounding the primer, e.g. at least about 10 to 15 total carbon atoms. Preferably the hydrocarbon groups are saturated but the unsaturated groups such as the alkenyl, aralkenyl and like groups may also be used if desired. Because the sealant composition includes a copolymerization catalyst for the sealant composition ingredients, where ethylenically unsaturated hydrocarbon groups are used, some copolymerization of the primer with the sealant may be obtained depending on the catalyst system, and if copolymerization is not desired in a particular application using such catalyst systems, the R groups of the above formula should not contain ethylenic unsaturation and especially vinyl unsaturation. Specific examples of suitable R groups are methyl, ethyl, propyl, pentyl, octyl, myristyl, stearyl, oleyl, docosyl, linoleyl, cyclohexylhexyl, cyclohexyl, etc.

The quaternary ammonium compounds may be obtained as commercial products from Armour and Company under the tradename "Arquad." The Arquads are di- and tri-methyl quaternary ammoniums compounds with the remaining group or groups being longer chain. The quaternary ammonium compounds are usually derived from ammonization of fatty acids such as soya fatty acids, cocoa fatty acids, tallow fatty acids, hydrogenated fatty acids, and the like. Other acids including the cycloaliphatic acids and aromatic acids may also be used in the preparation of the quaternary ammonium compound. The function of the R groups of the quaternary ammonium compound is to render the compound soluble in a solvent, such as a degreasing solvent, and other than imparting the solubility characteristic to the compound the nature of the R groups is unimportant. Specific quaternary ammonium compounds include, but are not limited to, dimethyl dioctyl quaternary ammonium chloride, di- (hydrogenated tallow) dimethyl quaternary ammonium nitrite, some chloride, some nitrate, some sulfate, di-coco dimethyl quaternary ammonium nitrite, di-soybean dimethyl quaternary ammonium chloride, di-hexadecyl di-hexyl quaternary ammonium nitrate, di-octadecyl didecyl quaternary ammonium sulfate, di-docosyl didecyl quaternary ammonium chloride, di-lauryl dimethyl quaternary ammonium chloride, di-(hydrogenated tallow) methyl benzyl quaternary ammonium nitrite, di-(hydrogenated tallow) dibenzyl quaternary ammonium chloride, di-octadecyl hexyl ethylbenzylethyl quatrenary ammonium chloride, dimyristyl dimethyl quaternary ammonium nitrite, di-heptadecyl dipropyl quaternary ammonium nitrite, di-octadecenyl dimethyl quaternary ammonium sulfate, di-stearyl di-(2,3-dimethyl hexyl) quaternary ammonium nitrite, octadecyl octadecenyl dimethyl quaternary ammonium chloride, di-dodecyl didecyl quaternary ammonium nitrite, di-hexadecyl dimethyl quaternary ammonium nitrite, etc.

In the nomenclature of compounds and compositions herein, the terms "hydrogenated tallow," "coco," and "soybean" have been used. These terms are recognized in the art as representing hydrocarbon groups derived from hydrogenated tallow fatty acids, coco fatty acids, and soybean fatty acids respectively. Such fatty acids are commercially available and, therefore, their use is advantageous in compositions herein. Amines having substituted alkyl groups derived from such acids and quaternary nitrites prepared therefrom may also be found available commercially. For example, Arquad 2HT nitrite is a di-(hydrogenated tallow) dimethyl quaternary ammonium nitrite available from Armour & Company. The hydrogenated tallow groups are mixtures of myristic, palmitic, stearic, and oleic groups and predominate in stearic and palmitic groups. The coco groups are mixtures of capric, lauric, palmitic, stearic, oleic and linoleic groups and predominate in capric, lauric and stearic groups, i.e., predominate in $C_{12}$ and $C_{16}$ alkyl groups.

The quaternary ammonium salts may be obtained commercially if desired, or alternatively, may be prepared by known reactions usually involving first a reaction of the tertiary amine with an alkyl or aralkyl halide to form the quaternary ammonium halide which may be converted, if desired, to the nitrite, nitrate, sulfate or the like.

The degreasing solvent, characterized by its ability to degrease, i.e. remove oils, fats and/or greases from, a metal or other surface, may be, for example, a solvent such as trichlorethylene, perchlorethylene, mineral spirits petroleum naphtha, Cellosolve, aromatics such as benzene, toluene, carbon tetrachloride, chloroform, hexane, etc. The solvent functions primarily as a carrier for the quaternary ammonium compound and for the metal soap and also has sufficient polarity to solubilize the greasy or oily film. The solvent need not be a degreasing solvent, e.g. in applications where no oil or grease is present on the surface to be primed. Also the surface can be degreased prior to application of the primer by vapor phase degreasing, if desired. Thus, the solvent need not be sufficiently polar to dissolve oils and greases. In any event, the solvent should be highly volatile below any elevated temperature at which the composition may be thermally destroyed and preferably at room temperature, so that the solvent may be removed without destroying the quaternary ammonium compound and/or soap or complex thereof.

The metal soap included in the composition is a soap of an acid sufficient to render the soap soluble in the solvent used, e.g. at least a $C_5$ or $C_6$ carboxylic acid, up to $C_{22}$ and higher, preferably a soap of copper, cobalt or manganese, with a fatty acid such as naphthenic, palmitic, stearic, octanoic, oleic, myristic, etc. Any of the commercial fatty acids used for preparation of the quaternary ammonium compound may be used, for example, as the acid portion of the metal soap. Other acids include hexanoic, cyclohexylhexanoic, benzoic, naphthalene carboxylic, salicylic, etc.

In addition to the solvent, quaternary ammonium compound, and metal soap, it may be desirable to include a small amount, e.g. less than 5%, of a polymerization catalyst for promoting polymerization of the sealant composition. The catalyst or promoter may conveniently be the same one as included in the sealant composition. Where the sealant composition is a combination of acrylic monomer and aromatic acid-polyol, prepolymer, such as described in the aforementioned U.S. Patent No. 3,249,656, the preferred promoter is an amide such as formamide. Tertiary amines and other well known accelerators may also be used.

As more specific examples of suitable primer compositions in accordance herewith, the following are offered for purposes of illustration but are not intended as limitations on the present invention:

*Example 1.*—A solution of 12.5 grams of Arquad 2S–75 and 1.4 grams of copper naphthenate in 683 grams trichlorethylene.

*Example 2.*—A solution of 0.5 gram Arquad 2C–50 and 0.07 gram copper naphthenate in 30 grams trichlorethylene.

*Example 3.*—0.5 gram Arquad 2S–75 in 30 grams trichlorethylene.

Arquad 2S–75 is a quaternary ammonium compound marketed as a 75% solution in isopropyl alcohol and having the structural formula:

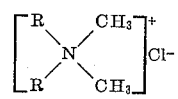

where R is a $C_{18}$ alkyl group derived from soya fatty acids. Arquad 2C–50 is a 50% solution in isopropyl alcohol of a quaternary ammonium nitrite having the formula:

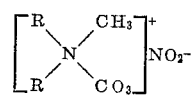

where R is in the range from $C_{12}$–$C_{16}$ and is derived from cocoa fatty acids.

In addition, for purposes of comparison, the following preparation was formulated:

*Preparation 1.*—0.07 gram copper naphthenate in 30 grams trichlorethylene.

Also for use herein, a sealant composition was prepared as follows: 15 weight percent diallyl phthalate prepolymer was dissolved in a 50:50 mixture of ethylene glycol dimethacrylate and tetraethylene glycol dimethacrylate; 4% by volume of formamide was added as catalyst and 0.85% by volume of cumene hydroperoxide was added as co-catalyst.

Examples 1, 2 and 3 and Preparation 1 above were subjected to a curing test procedure in accordance with the following: ⅜" screws and nuts having 24 threads per inch and having the surface characteristics identified in Table I below, were dipped in each of the compositions of Examples 1, 2 and 3 and Preparation 1 and permitted to dry. Two drops of the sealant composition were applied to the threads of each of the treated screws and to the threads of untreated screws for control, and the nut was then threaded on the screw. The set time, i.e. the time to a fingertight set of the nut on the screw, was noted. Also noted was the bond strength developed after 24 hours of cure. The bond strength is defined as the torque required to turn the nut at one-half revolution after the bond is broken. All tests were made at 75° F. The results were as reported in the following table:

| Surface Characteristics | Set Time, Minutes | | | | | Bond Strength after 24 hours Cure at 75° F. Prevailing Torque, ft. lbs. | | | | |
|---|---|---|---|---|---|---|---|---|---|---|
| | No Primer | Examples | | | Preparation 1 | No Primer | Examples | | | Preparation 1 |
| | | 1 | 2 | 3 | | | 1 | 2 | 3 | |
| Zinc plate | 60 | 5 | 8 | 10 | 15 | 4 | 16 | 14 | 4 | 8 |
| Cadmium plate | 45 | 5 | 8 | 10 | 15 | 4 | 16 | 14 | 4 | 8 |
| Medium-carbon steel | 30 | 5 | 10 | 5 | 15 | 18 | 20 | 17 | 18 | 16 |
| High-carbon steel (phosphate coating) | 60 | 10 | 15 | 10 | 25 | 20 | 26 | 22 | 20 | 20 |
| Anodized aluminum | 45 | 10 | 15 | 25 | 25 | 10 | 16 | 14 | 10 | 10 |

During the curing tests reported herein, no discoloration or attack on the surface of the screw or nut was detected using any of the primers tested. It can be readily seen from the test results that the primer Example 3, containing only a quaternary ammonium compound, improved the set time but not the final bond strength on such passive surfaces as zinc, cadmium and anodized aluminum. The primer Preparation 1 containing only the metal soap, also improved the set time but apparently did not promote or provide complete polymerization of the sealant composition as reflected by the low bond strength on zinc, cadmium and anodized aluminum. The primers of Examples 1 and 2, containing both the quaternary ammonium compound and metal soap, gave a fast set with complete polymerization and consequent high bond strength on all surfaces tested.

Other primer compositions were prepared and tested by the above curing test procedure. These included the compositions identified as to amounts of each component in the identified solvent reported in Table II:

TABLE II.—PRIMER COMPOSITIONS

| | Example 4 | Preparation 2 | Example 5 | Example 6 |
|---|---|---|---|---|
| Trichlorethylene, g | 30 | 30 | 30 | 30 |
| Arquad 25-75, g | .25 | | .125 | .125 |
| Cu naphthenate,[1] g | | .03 | .015 | |
| Co naphthenate,[2] g | | | | .015 |

[1] Cu naphthenate in mineral spirits supplying 8% Cu.
[2] Co naphthenate in mineral spirits supplying 8% Co.

The curing test results are reported in Table III, the surfaces of the nut and bolt being identified in each instance. The sealant used was as identified hereinabove.

TABLE III

| Surface Characteristics | Set Time, Minutes | | | | Prevailing Torque, 24 hours at 75° F., ft. lbs. | | | |
|---|---|---|---|---|---|---|---|---|
| | Examples | | | Preparation 2 | Examples | | | Preparation 2 |
| | 4 | 5 | 6 | | 4 | 5 | 6 | |
| Cadmium plate | 10 | 5 | 7 | 7 | 8 | 12 | 10 | 12 |
| Zinc plate | 15 | 5 | 5 | 10 | 6 | 12 | 10 | 12 |
| High-carbon steel | 9 | 5 | 10 | 15 | 9 | 19 | 18 | 16 |
| Medium-carbon steel | 7 | 5 | 10 | 20 | 17 | 18 | 15 | 15 |
| Anodized aluminum | 12 | 7 | 10 | 25 | 12 | 15 | 14 | 10 |

The combination of copper, cobalt or manganese soap with quaternary ammonium compound in the primer promotes both quick set and high strength.

The primer compositions of the present invention include a minor amount of the active ingredient, e.g. quaternary ammonium compound or quaternary ammonium compound plus metal soap, and major amounts of the solvent or carrier. The solvent or carrier includes a degreasing solvent. The primer compositions may be prepared as the more dilute normally used formulations or in the form of concentrates of the active ingredients in suitable solvent. The concentrates would be diluted with solvent before use. Primer concentrates may contain, for example, 0.1–10% metal soap, 10–99% quaternary ammonium compound and 0–90% solvent or carrier and preferably at least about 10% solvent. In the primer formulation, either prepared as such or diluted from a concentrate, the total quaternary ammonium compound and metal soap may be in the range of 0.1–20 weight percent in solvent, preferably about 1–3 weight percent. Also, in preferred compositions, the ratio of quaternary ammonium compound to metal soap is in the range of 3–1 to 100–1. The concentrates or formulations in accordance herewith may, if desired, include other additive agents such as the above-mentioned sealant composition promoter, anti-rusts, anti-oxidants, coloring agents, etc.

A satisfactory primer concentrate contains, for example, 12.5 parts by weight of Arquad 2S–75, 1.4 parts by weight of copper naphthenate solution (8% Cu), and 34 parts by weight of trichlorethylene. Prior to use, the concentrate is diluted, for example, with 20 parts by weight of any degreasing solvent, eg. trichlorethylene.

The primer is prepared simply by admixing the components. Reaction of the copper soap, for example, with the quaternary was evidenced by the fact that the green color, due to the Cu ion, disappears during the course of mixing. The reaction product is probably a cupric ion complex with the quaternary ammonium ion. Thus, the reaction products present due to combination of the metal soap and quaternary ammonium compound are believed to be ion complexes having the structure:

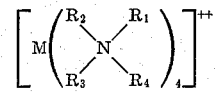

where M is copper, cobalt or manganese and $R_1$, $R_2$, $R_3$, and $R_4$ are as described hereinabove.

What is claimed is:
1. A primer composition for use on a surface comprising a major amount of solvent sufficient to remove grease and oil from the surface, a minor amount of a $C_5$ to $C_{22}$ carbolylic acid and soap selected from the class consisting of copper soap, cobalt soap and manganese soap and a minor amount of a quaternary ammonium compound having the formula:

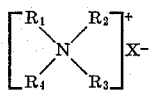

wherein $R_1$, $R_2$, $R_3$, and $R_4$ are each $C_1$–$C_{12}$ hydrocarbon groups and X is an inorganic anion, said soap and quaternary ammonium compound each being soluble in said solvent, said quaternary ammonium compound and soap being present in said solvent in a total amount in the range of 0.1 to 20 weight percent and in a weight ratio of quaternary ammonium compound: soap in the range of 3:1 to 100:1, said solvent being highly volatile below the thermal destruction temperature of the composition and ingredients thereof.

2. A primer composition for use in dilution strength on a surface comprising a soap of a $C_5$ to $C_{22}$ carboxylic acid selected from the class consisting of copper soap, cobalt soap and manganese soap and a quaternary ammonium compound having the formula:

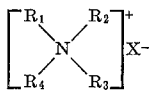

wherein $R_1$, $R_2$, $R_3$, and $R_4$ are each $C_1$–$C_{12}$ hydrocarbon groups and have a total of at least 10 to 15 carbon atoms and X is an inorganic anion, said quaternary ammonium compound and soap being present in a weight ratio in the range of 3:1 to 100:1, said solvent being highly volatile below the thermal destruction temperature of the composition and ingredients thereof.

3. A primer composition for use in dilution strength on a surface comprising one part by weight of copper naphthenate and 3 to 100 parts by weight of a quaternary ammonium compound having a formula:

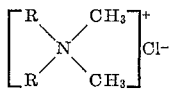

wherein R is a $C_{18}$ alkyl group derived from soya fatty acids.

4. A primer composition for use in dilution strength on a surface comprising one part by weight of a cobalt naphthenate and 3 to 100 parts by weight of a quaternary ammonium compound having the formula:

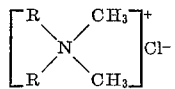

wherein R is a $C_{18}$ alkyl group derived from soya fatty acids.

5. A primer composition for use in dilution strength on a surface comprising one part by weight of a copper naphthenate and 3 to 100 parts by weight of a quaternary ammonium compound having the formula:

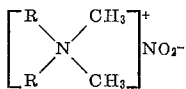

wherein R is open chain hydrocarbon in the $C_{12}$ to $C_{16}$ range derived from coco fatty acid.

6. A primer composition for use in coating a metal surface comprising a metal soap, of a $C_5$ to $C_{22}$ carboxylic acid, a quaternary ammonium compound having four $C_1$–$C_{22}$ hydrocarbon groups and a solvent, said soap and quaternary ammonium compound being soluble in said solvent, and being present in an amount in the range of 0.1 to 20 weight percent in said composition, said solvent being highly volatile below the thermal destruction temperature of the composition and ingredients thereof.

7. A primer composition for use on a surface comprising up to 90 percent weight of a solvent as a carrier, 0.1 to 10 weight percent of a soap selected from the class consisting of copper soap, cobalt soap and manganese soap of a $C_5$ to $C_{22}$ carboxylic acid and 10 to 99 weight percent of quaternary ammonium compound having the formula:

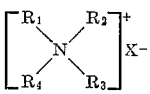

wherein $R_1$, $R_2$, $R_3$, and $R_4$ are each $C_1$ to $C_{22}$ aliphatic hydrocarbon groups, the total carbon atoms of $R_1$, $R_2$, $R_3$, and $R_4$ being at least 10 to 15, and X is selected from the class consisting of halogen, nitrite, nitrate and sulphate, said soap and quaternary ammonium compound each being soluble in said solvent, said solvent being highly volatile below the thermal destruction temperature of the composition and ingredients thereof.

8. A primer composition for use on a surface comprising up to 90 weight percent of trichlorethylene solvent as a carrier, 10 to 99 weight percent of a quaternary ammonium compound having the formula:

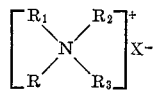

wherein $R_1$, $R_2$, $R_3$, and $R_4$ are each $C_1$–$C_{12}$ hydrocarbon groups and X is selected from the class consisting of halogen, nitrite, nitrate and sulphate, said quaternary ammonium compound being soluble in said solvent, and 0.1 to 5 weight percent of formamide.

9. A method of rendering a relatively inactive surface more active for promoting polymerization of an amide catalyzed mixture of normally liquid acrylic ester and low molecular weight prepolymer of an ester of allylic alcohol and an aromatic polycarboxylic acid, and of promoting such polymerization which method comprises applying to said surface a primer composition including a solvent sufficient to remove grease and oil from the surface, and from 0.1 to 20 weight percent, based on solvent, of a quaternary ammonium compound having the formula:

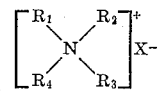

wherein $R_1$, $R_2$, $R_3$, and $R_4$ are each $C_1$ to $C_{22}$ hydrocarbon groups having a total of at least 5 to 6 carbon atoms and X is selected from the class consisting of halogen, nitrite, nitrate and sulphate, said quaternary ammonium compound being soluble in said solvent, permitting said solvent to volatilize and thereafter applying said amide catalyzed mixture thereover, said solvent being highly volatile below the thermal destruction temperature of the composition and ingredients thereof.

10. A primer composition for use in priming a metal surface preparatory to applying a sealant composition to said surface, comprising a degreasing solvent, a metal soap of a $C_5$ to $C_{22}$ carboxylic acid soluble in said solvent, a quaternary ammonium compound having four $C_1$–$C_{22}$ hydrocarbon groups soluble in said solvent and a catalyst effective for accelerating setting of said sealant composition and soluble in said solvent, said solvent being highly volatile below the thermal destruction temperature of the composition and ingredients thereof.

11. A primer composition for use on a surface comprising of a solvent sufficient to remove grease and oil from the surface, a soap of a $C_5$ to $C_{22}$ carboxylic acid selected from the class consisting of copper soap, cobalt soap and manganese soap and a quaternary ammonium compound having the formula:

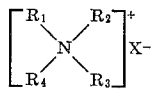

wherein $R_1$, $R_2$, $R_3$, and $R_4$ are each $C_1$–$C_{12}$ hydrocarbon groups and X is selected from the class consisting of halogen, nitrite, nitrate and sulphate, said soap and quaternary ammonium compound each being soluble in said solvent, and being present in a total amount of 0.1 to 20 weight percent in said solvent and a weight ratio of quaternary ammonium compound:soap in the range of 3:1 to 100:1, said solvent being highly volatile below the thermal destruction temperature of the composition and ingredients thereof.

12. In a sealant composition applied to a metal surface for securing another metal surface in closely facing contact therewith and containing a room temperature setting, mixture of normally liquid acrylic ester and low molecular weight prepolymer of an ester of allylic alcohol and an aromatic polycarboxylic acid and a catalyst for promoting polymerization of the sealant composition at room temperature, the improvement which comprises a soluble quaternary ammonium compound having the formula:

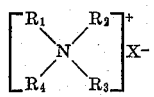

wherein $R_1$, $R_2$, $R_3$, and $R_4$ are each $C_1$–$C_{12}$ hydrocarbon groups and X is an inorganic anion, said quaternary ammonium compound being in contact both with said metal surface and the sealant composition and being present in amount in the range of 0.1 to 20 weight percent sufficient to improve the setting time of the sealant composition upon application of another metal surface to the sealant composition to closely face the first mentioned metal surface.

13. In a method for adhering metal surfaces in which a sealant composition comprising a catalyzed liquid room temperature setting, mixture of normally liquid acrylic ester and low molecular weight prepolymer of an ester of allylic alcohol and an aromatic polycarboxylic acid is applied between closely facing metal surfaces, the improvement which comprises contacting the sealant composition while in liquid state, and both metal surfaces, with a quaternary ammonium compound having the formula:

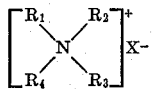

wherein $R_1$, $R_2$, $R_3$ and $R_4$ are each $C_1$–$C_{12}$ hydrocarbon groups and X is an inorganic anion, in a minor amount of from 0.1 to 20 weight percent sufficient to improve the set time of the sealant composition.

14. An activator composition for application to a metal surface for contact with a sealant composition containing a glycl dimethacrylate as the polymerizeable monomer and as the major constituent and a catalyst for promoting polymerization of the sealant composition at room temperature, the improvement which comprises a soluble quaternary ammonium compound having the formula:

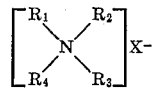

wherein $R_1$, $R_3$ and $R_4$ are each $C_1$ to $C_{22}$ hydrocarbon groups and X is an inorganic anion, said quaternary ammonium compound being in contact both with said metal surface and the sealant compoistion and being present in amount in the range of 0.1 to 20 weight percent sufficient to improve the setting time of the sealant composition upon application of another metal surface to the sealant composition to closely face the first mentioned metal surface.

No references cited.

ALLAN LIEBERMAN, *Primary Examiner.*